US010139681B2

(12) United States Patent
Deng et al.

(10) Patent No.: US 10,139,681 B2
(45) Date of Patent: Nov. 27, 2018

(54) ARRAY SUBSTRATE AND LIQUID CRYSTAL DISPLAY DEVICE

(71) Applicants: BOE TECHNOLOGY GROUP CO., LTD., Beijing (CN); CHENGDU BOE OPTOELECTRONICS TECHNOLOGY CO., LTD., Chengdu, Sichuan (CN)

(72) Inventors: Yin Deng, Beijing (CN); Haigang Qing, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

( * ) Notice: Subject to any disclaimer, the term of this patent is extended or adjusted under 35 U.S.C. 154(b) by 0 days.

(21) Appl. No.: 15/353,866

(22) Filed: Nov. 17, 2016

(65) Prior Publication Data
US 2017/0219887 A1 Aug. 3, 2017

(30) Foreign Application Priority Data

Feb. 2, 2016 (CN) .......................... 2016 1 0073658

(51) Int. Cl.
G02F 1/1337 (2006.01)
G02F 1/1343 (2006.01)
G02F 1/1368 (2006.01)
G02F 1/1362 (2006.01)
G02F 1/1333 (2006.01)
G02F 1/1335 (2006.01)
G02F 1/137 (2006.01)

(52) U.S. Cl.
CPC ...... *G02F 1/133707* (2013.01); *G02F 1/1368* (2013.01); *G02F 1/134309* (2013.01);
(Continued)

(58) Field of Classification Search
CPC ......... G02F 1/134363; G02F 1/133707; G02F 1/1368; G02F 1/136286
See application file for complete search history.

(56) References Cited

U.S. PATENT DOCUMENTS 9,383,612 B2 * 7/2016 Huh .................. G02F 1/133707
2010/0085287 A1 4/2010 Shimomaki
(Continued)

FOREIGN PATENT DOCUMENTS

CN 101718922 A 6/2010
CN 101957529 A 1/2011
(Continued)

OTHER PUBLICATIONS

First Chinese Office Action dated Jul. 28, 2016; Appln. No. 201610073658.4.
(Continued)

*Primary Examiner* — Dung Nguyen
(74) *Attorney, Agent, or Firm* — Ladas & Parry LLP

(57) ABSTRACT

An array substrate and a display device including the array substrate are disclosed. The array substrate includes: gate lines and data lines, gate lines and data lines defining sub-pixels arranged in an array, each of the sub-pixels being provided with a pixel electrode; and a common electrode located over the sub-pixels and including first sub-common electrodes and second sub-common electrodes in one-to-one correspondence with the sub-pixels. Each second sub-common electrode is connected between two adjacent first sub-common electrodes, each of the first sub-common electrodes is provided with first slits therein, the second sub-common electrode distributed in an extension direction of the first slits is provided with second slits therein, and there is an angle between an extension direction of the second slits and the extension direction of the first slits.

20 Claims, 4 Drawing Sheets

(52) U.S. Cl.
CPC .. *G02F 1/134363* (2013.01); *G02F 1/136286* (2013.01); *G02F 1/137* (2013.01); *G02F 1/13439* (2013.01); *G02F 1/133345* (2013.01); *G02F 1/133514* (2013.01); *G02F 1/136227* (2013.01); *G02F 2001/134345* (2013.01); *G02F 2001/134372* (2013.01); *G02F 2201/121* (2013.01); *G02F 2201/123* (2013.01)

(56) References Cited

U.S. PATENT DOCUMENTS

| | | | |
|---|---|---|---|
| 2011/0063559 A1 | 3/2011 | Go | |
| 2011/0234935 A1* | 9/2011 | Konno | G02F 1/134363 349/43 |
| 2017/0003555 A1* | 1/2017 | Umeda | G02F 1/133707 |

FOREIGN PATENT DOCUMENTS

| | | |
|---|---|---|
| CN | 102681276 A | 9/2012 |
| CN | 202600316 U | 12/2012 |
| CN | 203133455 U | 8/2013 |
| CN | 103713431 A | 4/2014 |
| JP | 2011-059649 A | 3/2011 |

OTHER PUBLICATIONS

Second Chinese Office Action dated Nov. 7, 2016; Appln. No. 201610073658.4.

Chinese Patent Office Search Report dated May 13, 2016; Appln. No. 201610073658.4.

* cited by examiner

ARRAY SUBSTRATE AND LIQUID CRYSTAL DISPLAY DEVICE

TECHNICAL FIELD

Embodiments of the present disclosure relate to an array substrate and a liquid crystal display device.

BACKGROUND

Liquid crystal display devices have become the most popular display devices and can be classified into TN (Twisted Nematic) mode and FFS (Fringe Field Switching) mode, etc. According to their display modes, liquid crystal display devices of an FFS mode are applied more and more due to their advantages of wide viewing angle and high transmission efficiency.

SUMMARY

Embodiments of the present disclosure provides an array substrate and a liquid crystal display device which can avoid trace mura during in the operation of display.

In a first aspect of the present disclosure, there is provided an array substrate, comprising: a plurality of gate lines and a plurality of data lines, the plurality of gate lines and the plurality of data lines defining a plurality of sub-pixels arranged in an array, each of the sub-pixels being provided with a pixel electrode; and a common electrode located over the plurality of sub-pixels and comprising a plurality of first sub-common electrodes and a plurality of second sub-common electrodes in one-to-one correspondence with the plurality of sub-pixels. Each second sub-common electrode is connected between two adjacent first sub-common electrodes, each of the first sub-common electrodes is provided with first slits therein, the second sub-common electrode distributed in an extension direction of the first slits is provided with second slits therein, and there is an angle between an extension direction of the second slits and the extension direction of the first slits.

In a second aspect of the present disclosure, there is provided a liquid crystal display device, comprising the above array substrate, a color filter substrate disposed oppositely to the array substrate, and a liquid crystal molecule layer between the array substrate and the color filter substrate.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not (imitative of the present disclosure.

DETAILED DESCRIPTION

Figure 1:
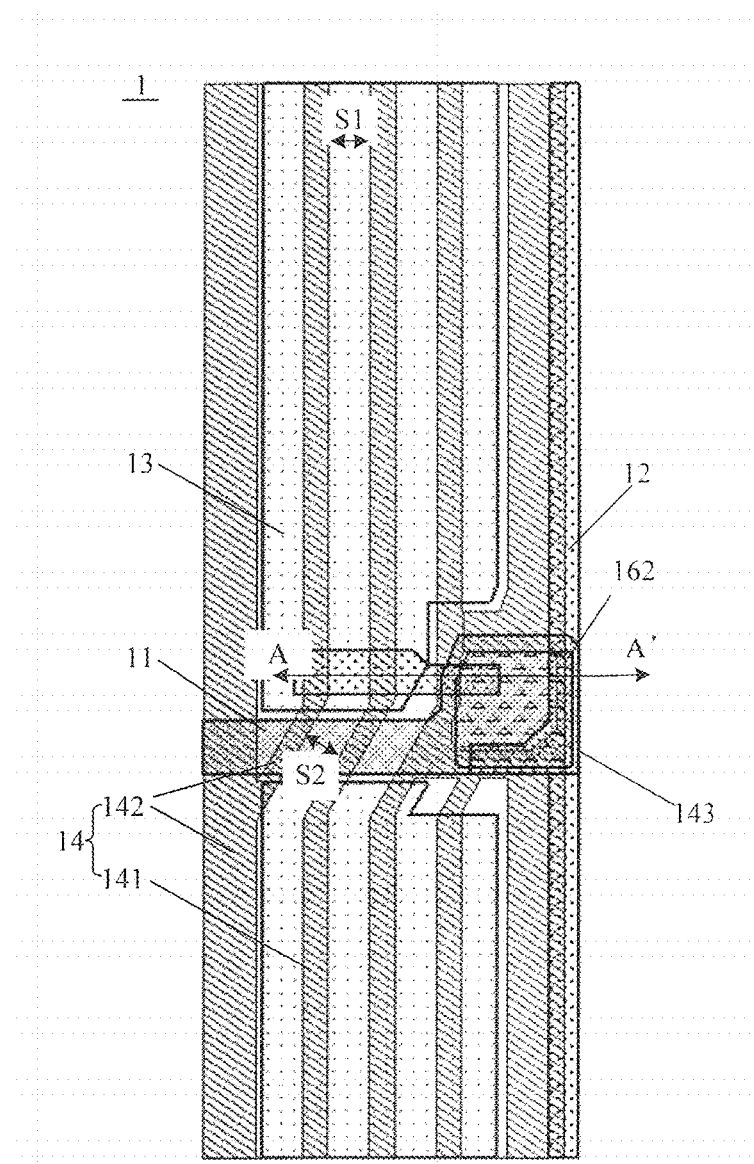
FIG. 1 is a first plan view of an array substrate provided in an embodiment of the present disclosure.

The technical solution in embodiments of the present disclosure will be described below clearly and completely with reference to accompanying drawings in embodiments of the present disclosure. However, it is obvious that the described embodiments are partial embodiments rather than all embodiments. All other embodiments obtained by one of ordinary skill in the art based on embodiments in the present disclosure without any creative work fall within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

A liquid crystal display device of an FFS mode includes an array substrate and a color filter substrate disposed opposite each other and further includes a liquid crystal molecule layer located between the substrates. The array substrate is divided into a plurality of sub-pixels, each of which is provided with a pixel electrode therein. The array substrate is further provided with a common electrode covering the plurality of sub-pixels and having slits at locations corresponding to the sub-pixel's middle areas. An electric field is formed between each of the pixel electrodes and the common electrode in operation.

The inventors of the present application have noted that, as for the above-mentioned liquid crystal display device of an FFS mode, because a horizontal electric field is formed between the common electrode and the pixel electrode in each sub-pixels' middle area, liquid crystal molecules in the area are aligned along their long axes perpendicular to the extension direction of slits of the common electrode; while in edge areas of sub-pixels, liquid crystal molecules are aligned along their long axes parallel to the extension direction of slits, which results in significantly different deflection states of liquid crystal molecules on two sides of the boundary between the middle area and the edge area of each sub-pixel, and in turn results in poor restoring force of the liquid crystal molecule layer (i.e., poor capability of the liquid crystal molecule layer of restoring the initial state), thereby likely causing the problem of trace mura (an image sticking phenomenon caused by liquid crystal molecules incapable of be deflected to the deflection state required for the current frame after the previous frame is concluded) in the display process of the liquid crystal display device.

An embodiment of the present disclosure provides an array substrate. As illustrated in FIG. 1, the array substrate 1 includes a plurality of gate lines 11 and a plurality of data lines 12, the gate lines 11 and the data lines 12 intersect each other to define a plurality of sub-pixels arranged in an array, and each of the sub-pixels is provided with a pixel electrode such as a plate-like pixel electrode 13 therein; the plate-like pixel electrode have slits therein. The array substrate 1 further includes a common electrode 14 located over the plurality of sub-pixels and including a plurality of first sub-common electrodes 141 (or first sub-common electrode sections) and a plurality of second sub-common electrodes 142 (or second first sub-common electrode sections). A second sub-common electrode 142 is connected between two adjacent first sub-common electrodes 141. Each first sub-common electrode 141 is provided with a first slit or first slits S1, and the second sub-common electrode 142 distributed in the extension direction of the first slit(s) S1 is provided with a second slit or second slits S2. There is an angle between the extension direction of the second slit(s) S2 and that of the first slit(s) S1, and this angle is not equal to zero (0). In addition, it should be noted that generally an angle between two straight lines (or two directions) may be an acute or an obtuse angle (the sum of the acute angle and the obtuse angle is 180 degrees), but in this disclosure, only the acute angle is deemed as the angle between the two straight lines (or directions). The magnitude of the angle may be determined in a comprehensive manner for example according to the distance between two adjacent sub-pixels in the extension direction of the first slits S1 and the size of the sub-pixel in the direction perpendicular to the extension direction of the first slits S1, such that the second slits S2 in the second sub-common electrode 142 can penetrate the second sub-common electrode 142.

When the array substrate having the above-mentioned structure provided in the embodiment of the present disclosure is applied in a liquid crystal display device, the deflection state of liquid crystal molecules corresponding to the second sub-common electrodes 142 is between the deflection state of liquid crystal molecules corresponding to the first sub-common electrodes 141 (long axes of liquid crystal molecules parallel to the extension direction of the first slit(s)) and no deflection (long axes of liquid crystal molecules perpendicular to the extension direction of first slit(s)), thereby effectively increasing the restoring force of the liquid crystal molecules and in turn avoiding trace mura in the display process of the liquid crystal display device.

Figure 2:
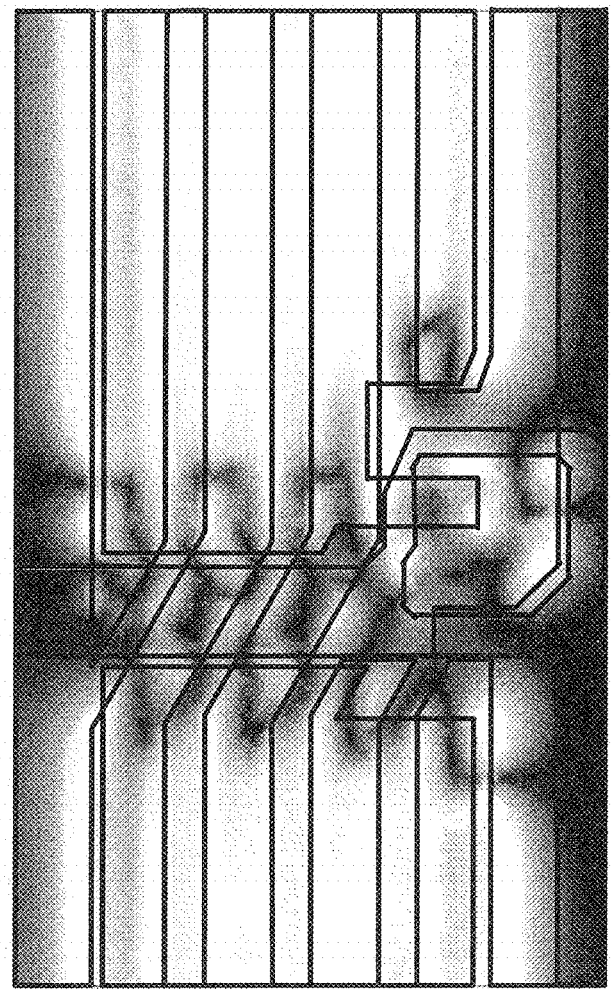
FIG. 2 is an optical simulation diagram of an array substrate provided in an embodiment of the present disclosure.

In addition, because the plurality of first sub-common electrodes 141 are in one-to-one correspondence with the plurality of sub-pixels and each second sub-common electrode 142 is connected between two adjacent first sub-common electrodes 141, as illustrated in FIG. 2, the second slit S2 provided in the second sub-common electrode 142 does not occupy or occupies as less as possible the area where the sub-pixel is located such that the edges of the sub-pixels also can have high light transmittance in operation. Therefore, in applying the array substrate in a liquid crystal display device, it is also possible to allow the black matrix on the color filter substrate disposed oppositely to have a small width and in turn effectively enhance aperture ratio of the liquid crystal display device.

It is to be noted that the above described embodiment does not limit the specific structure of the second sub-common electrodes distributed in the direction perpendicular to the extension direction of the first slits S1, and that the structure may be configured by one of ordinary skill in the art according to practical demands. As an example, in the embodiment of the present disclosure, as illustrated in FIG. 1, the second sub-common electrodes 142 distributed perpendicularly to the extension direction of the first slits S1 can be strip electrodes, that is, there is no slit provided in these second sub-common electrodes 142. In this case, the width of the second sub-common electrodes 142 is large, which is in favor of reducing the resistance of the entire common electrode and thereby in favor of enhancing the display effect of the liquid crystal display device.

The extension direction of the first slit S1 may be the same as the extension direction of the gate lines 11 or the extension direction of the data lines 12, or may form an angle with either of the above two directions. Since generally a sub-pixel has a small size in the extension direction of the gate line 11 and a large size in the extension direction of the data line 12, and generally the gate line 11 has a large width while the data line 12 has a small width. Therefore, in one example, as illustrated in FIG. 1, the extension direction of the first slit S1 is the same as the extension direction of the data line 12 such that more liquid crystal molecules can deflect under the action of the horizontal electric field formed between the first common electrode 141 and the pixel electrodes 13 and in turn can further improve the aperture ratio of the liquid crystal display device applying the array substrate.

In one example, as illustrated in FIG. 1, the second slits S2 communicate with the first slits S1, and the spacing between two adjacent first slits S1 is the same as the spacing between two adjacent second slits S2 such that the common electrode 14 has a simple structure and any area with extremely small width can be avoided on the common electrode 14, which facilitates the common electrode 14 to have a small resistance, reduces loss possibility of common electrode signals during transmission, thereby facilitating further improving display effect of the liquid crystal display device. As an example, the first slits S1 and the second slits S2 may have the same width.

Furthermore, it is to be noted that the array substrate 1 in the embodiment of the present disclosure includes not only the above-mentioned pixel electrodes 13 and the common electrode 14, but also may include other structures. In order to facilitate one skilled in the art to understand, three exemplary structures of the array substrate will be described in more detail. However, the structure of the array substrate is not limited thereto. One skilled in the art may implement reasonable configurations according to the following contents, which will not be described one by one herein. In the drawings, the configuration of one sub-pixel is illustrated, and other sub-pixels of the array substrate may have the same configuration.

First Exemplary Structure

Figure 3:
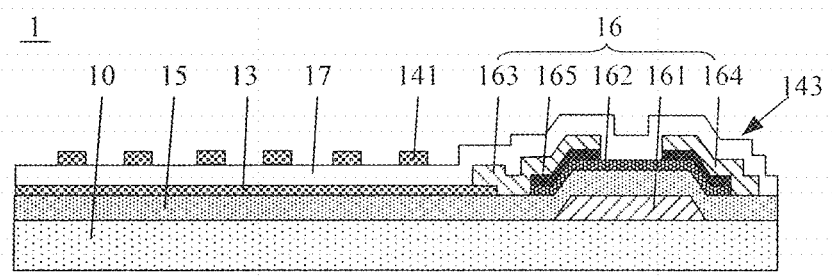
FIG. 3 is a first sectional diagram taken along AA' direction in FIG. 1.

As illustrated in FIG. 3, the array substrate 1 may further include a base substrate 10, a gate insulating layer 15, a thin film transistor 16 and a passivation layer 17, wherein the thin film transistor 16 includes a gate electrode 161, an active layer 162, a source electrode 163 and a drain electrode 164. The above structure has the following position relationships with respect to the pixel electrode 13 and the common electrode 14. The gate electrode 161 of the thin film transistor 16, the gate insulating layer 15, the active layer 162 of the thin film transistor 16, the pixel electrode 13, the source electrode 163 and the drain electrode 164 of the thin film transistor 16, the passivation layer 17 and the common electrode 14 are stacked successively on the base substrate 10, while the source electrode 163 of the thin-film transistor 16 is lapped on the pixel electrode 13 so that the source electrode 163 is directly connected with the pixel electrode 13.

In the present embodiment, as illustrated in FIGS. 1 and 3, the common electrode 14 includes a plurality of hollow areas 143 in one-to-one correspondence (in terms of positions and sizes) with the active layers 162 of the thin film transistors 16 on the array substrates to avoid formation of parasitic capacitance between the common electrode 14 and the active layers 162 of the thin film transistors 16, which facilitates reducing the power consumption of the liquid crystal display device and maintains stable voltage of the common electrode, endowing the liquid crystal display device with better display effect.

Second Exemplary Structure

Figure 4:
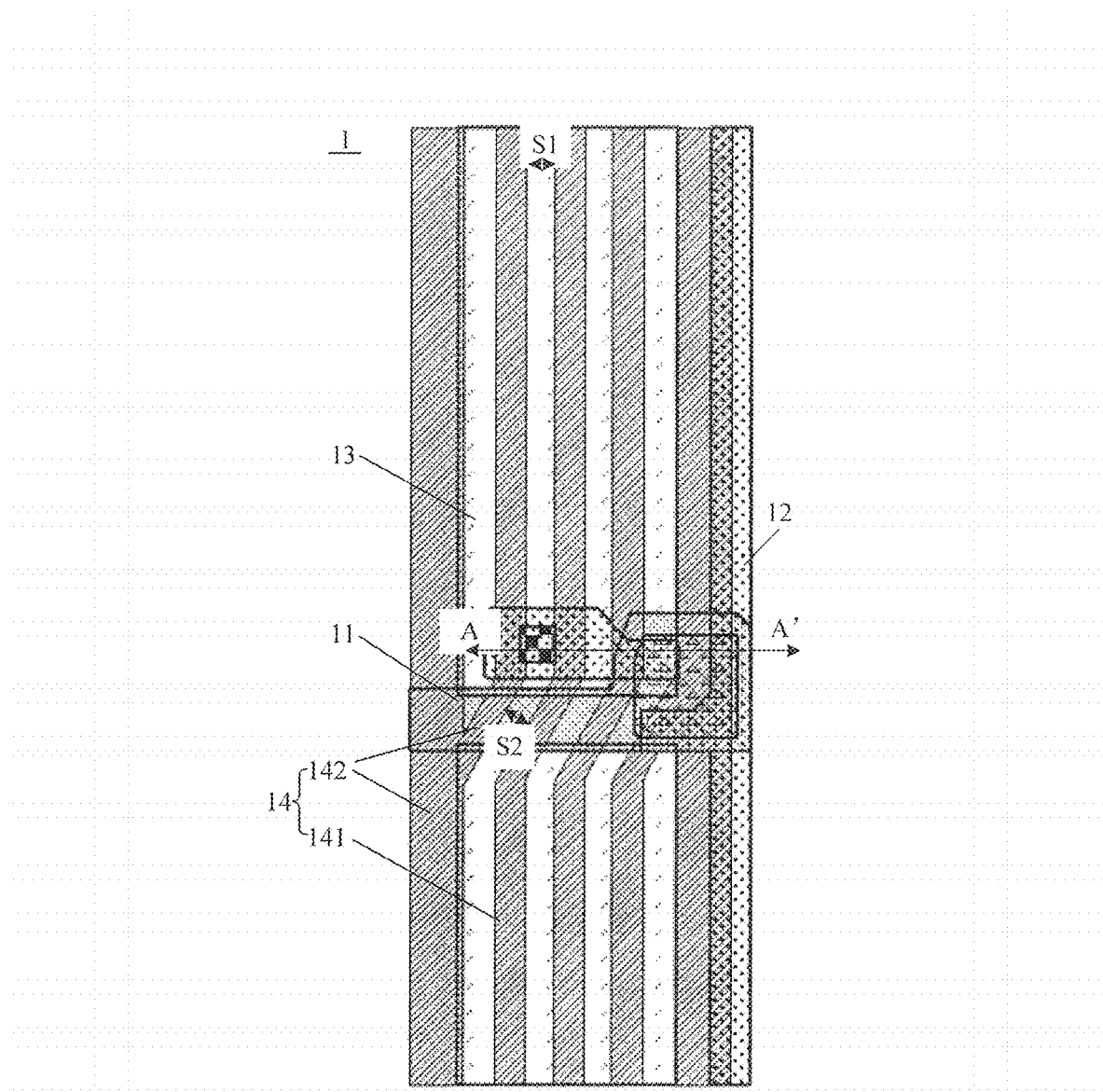
FIG. 4 is a second plan view of an array substrate provided in an embodiment of the present disclosure.
Figure 5:
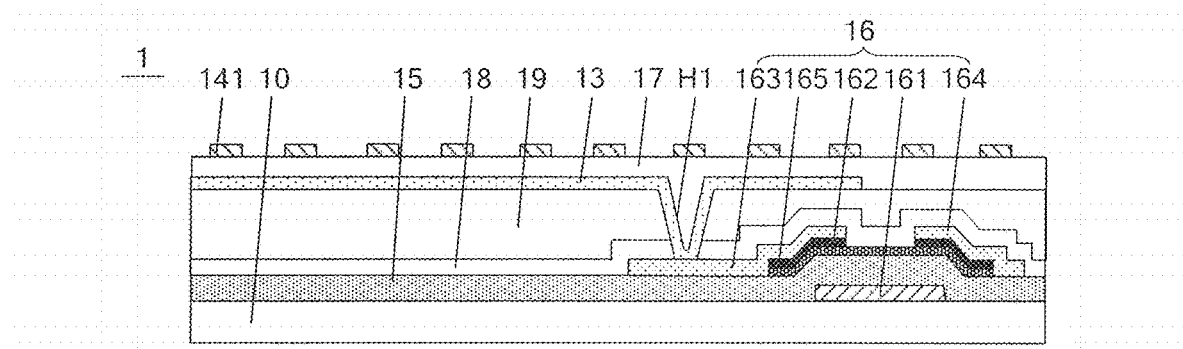
FIG. 5 is a first sectional view taken along AA' direction in FIG. 4.

As illustrated in FIGS. 4 and 5, the array substrate 1 may further include a base substrate 10, a gate insulating layer 15, a thin film transistor 16, a passivation layer 17, an interlayer insulating layer 18 and a resin insulating layer 19, wherein the thin film transistor 16 includes a gate electrode 161, an active layer 162, a source electrode 163 and a drain electrode 164. The above structure has the following position relationships with respect to the pixel electrode 13 and the common electrode 14. The gate electrode 161 of the thin film transistor 16, the gate insulating layer 15, the active layer 162 of the thin film transistor 16, the source electrode 163 and the drain electrode 164 of the thin film transistor 16, the interlayer insulating layer 18, the resin insulating layer 19, the pixel electrodes 13, the passivation layer 17 and the common electrode 14 are stacked successively on the base substrate 10. As illustrated in FIG. 5, the array substrate 1 further includes a first via hole H1 penetrating through the resin insulating layer 19 and the interlayer insulating layer 18 through which the pixel electrode 13 is electrically connected with the source electrode 163 of the thin film transistor 16.

Because an interlayer insulating layer 18, a resin insulating layer 19 and a passivation layer 17 are disposed between the active layer 162 of the thin film transistor 16 and the common electrode 14 in the embodiment illustrated in FIG. 5, the parasitic capacitance formed between the active layer 162 of the thin film transistor 16 and the common electrode 14 is rendered very small. Therefore, in one example, as illustrated in FIG. 4, the common electrode 14 covers the entire array substrate 1 such that liquid crystal molecules corresponding to the thin film transistors can also deflect and it is in turn possible to effectively enhance the aperture ratio of the liquid crystal display device applying the array substrate 1.

Third Exemplary Structure

Figure 6:
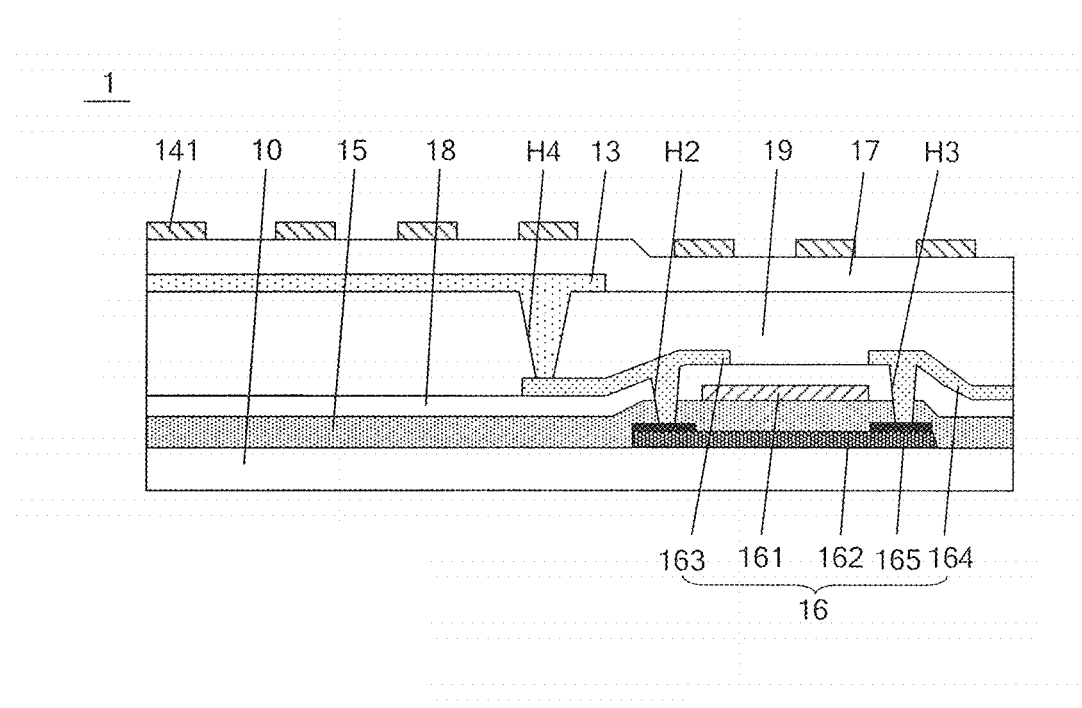
FIG. 6 is a second sectional view taken along AA' direction in FIG. 4.

As illustrated in FIGS. 4 and 6, the array substrate 1 may further include a base substrate 10, a gate insulating layer 15, a thin film transistor 16, a passivation layer 17, an interlayer insulating layer 18 and a resin insulating layer 19, wherein the thin film transistor 16 includes an active layer 162, a gate electrode 161, a source electrode 163 and a drain electrode 164. The above structure has the following position relationships with respect to the pixel electrode 13 and the common electrode 14. The active layer 162 of the thin film transistor 16, the gate insulating layer 15, the gate electrode 161 of the thin film transistor 16, the interlayer insulating layer 18, the source electrode 163 and the drain electrode 164 of the thin film transistor 16, the resin insulating layer 19, the pixel electrode 13, the passivation layer 17 and the common electrode 14 are stacked successively on the base substrate 10. As illustrated in FIG. 5, the array substrate 1 further includes a second via hole H2 penetrating the gate insulating layer 15 and the interlayer insulating layer 18 through which the source electrode 163 of the thin-film transistor 16 is electrically connected with the active layer 162 of the thin-film transistor 16, a third via hole H3 penetrating the gate insulating layer 15 and the interlayer insulating layer 18 through which the drain electrode 164 of the thin-film transistor 16 is electrically connected with the active layer 162 of the thin-film transistor 16, and a fourth via hole H4 penetrating the resin insulating layer 19 through which the pixel electrode 13 is electrically connected with the source electrode 163 of the thin-film transistor 16.

In order to prevent the metal ions in the base substrate 10 from contaminating the active layer 162 of the thin film transistor 16 in the present embodiment, in one example, a buffer layer is disposed between the active layer 162 of thin film transistor 16 and the base substrate 10.

Similarly, because a gate insulating layer 15, an interlayer insulating layer 18, a resin insulating layer 19 and a passivation layer 17 are disposed between the active layer 162 of the thin film transistor 16 and the common electrode 14 in the embodiment illustrated in FIG. 6, the parasitic capacitance formed between the active layer 162 of the thin film transistor 16 and the common electrode 14 is rendered very small. Therefore, in one example, as illustrated in FIG. 4, the common electrode 14 covers the entire array substrate 1 such that liquid crystal molecules corresponding to the thin film transistors can also deflect and it is in turn possible to effectively enhance the aperture ratio of the liquid crystal display device applying the array substrate 1.

As illustrated in FIGS. 1 and 4, the active layers 162 of thin film transistors 16 included in the above three kinds of array substrates 1 all have rectangle projections on the base substrate 10, in each of the thin film transistor 16, the source electrode 163 of the thin film transistor 16 is connected at an apex angle of the rectangle of the projection with the active layer 162, and the drain electrode 164 of the thin film transistor 16 is connected with two edges of the active layer 162 that are not adjacent to the apex angle of the rectangle, which results in a large "width-length ratio" of the channel of thin film transistor 16, facilitating enhancing the operating current of the thin film transistor 16 and in turn enhancing the display effect of the liquid crystal display device employing the array substrate 1.

Of course, one skilled in the art may easily contemplate other specific shapes, such as circle and hexagon, for the active layer 162 and specific connection modes for the source electrode 163 and the drain electrode 164 with the active layer 162, which will not be described any more herein.

Optionally, the material for the active layer 162 of the thin film transistor 16 included in each of the above three array substrates 1 is made of amorphous silicon or low temperature poly-silicon or oxide semiconductor material. Then, in order to reduce the contact resistance of the active layer 162 with the source electrode 163 and the drain electrode 164 of the thin film transistor 16, an ohmic contact layer 165 is disposed on the part of the active layer 162 that is connected with the source electrode 163 and the drain electrode 164 which may be obtained for example by doping the active layer 162.

Optionally, the material for the passivation layer 17 included in each of the above three kinds of array substrates 1 is silicon nitride or silicon oxide; and the material for the interlayer insulating layers 18 included in each of the latter two kinds of array substrates 1 is silicon nitride or silicon oxide.

Based on the same inventive concept, an embodiment of the present disclosure further provides a liquid crystal display device including the array substrate 1 described in any of the above embodiments, an opposing substrate (e.g., a color filter substrate) disposed oppositely to the array substrate 1, and a liquid crystal molecule layer between the array substrate 1 and the opposing substrate.

Optionally, there is provided a grid-like black matrix and a color filter layer filled between the black matrix on the color filter substrate, in which the color filter layer may include red sub-areas, green sub-areas and blue sub-areas corresponding to the sub-pixels on the array substrate.

The display device may be any product or component having display function such as a liquid crystal panel, a mobile phone, a tablet computer, a TV set, a display, a notebook computer, a digital picture frame or a navigator.

Because the liquid crystal display device includes the array substrate as described above, the liquid crystal display device has the same beneficial effects as the above-described array substrate, which will not be described any more herein.

What are described above is related to the illustrative embodiments of the present disclosure only and not limitative to the scope of the present disclosure; the scopes of the present disclosure are defined by the accompanying claims.

The application claims priority to the Chinese patent application No. 201610073658.4, filed Feb. 2, 2016, the entire disclosure of which is incorporated herein by reference as part of the present application.

What is claimed is:

1. An array substrate, comprising:
   a plurality of gate lines and a plurality of data lines, the plurality of gate lines and the plurality of data lines defining a plurality of sub-pixels arranged in an array, each of the sub-pixels being provided with a pixel electrode; and
   a common electrode located over the plurality of sub-pixels and comprising a plurality of first sub-common electrodes and a plurality of second sub-common electrodes, and the plurality of first sub-common electrodes are in one-to-one correspondence with the plurality of sub-pixels;
   wherein each second sub-common electrode is connected between two adjacent first sub-common electrodes which correspond to two sub-pixels respectively;
   each of the first sub-common electrodes is provided with first slits therein, and the second sub-common electrode is provided with second slits therein; and there is an angle between an extension direction of the second slits and an extension direction of the first slits.

2. The array substrate of claim 1, wherein between every two first slits which are adjacent in the extension direction of the first slits is provided with one of the second slits connecting the two first slits.

3. The array substrate of claim 1, wherein the extension direction of the first slits is same as an extension direction of the data lines.

4. The array substrate of claim 1, wherein the extension direction of the first slits is same as an extension direction of the gate lines.

5. The array substrate of claim 1, wherein the extension direction of the first slit forms an angle with an extension direction of the data.

6. The array substrate of claim 1, wherein the second slits and the first slits communicate with each other and a spacing between two adjacent first slits is same as a spacing between two adjacent second slits.

7. The array substrate of claim 1, wherein the second sub-common electrodes are distributed perpendicularly to the extension direction of the first slits and are strip-like electrodes.

8. The array substrate of claim 1, wherein the first slits and the second slits have a same width.

9. The array substrate of claim 1, further comprising a base substrate, a gate insulating layer, a thin film transistor in each of the sub-pixels and a passivation layer; the thin film transistor comprising a gate electrode, an active layer, a source electrode and a drain electrode,
   wherein the gate electrode of the thin film transistor, the gate insulating layer, the active layer of the thin film transistor, the pixel electrode, the source electrode and the drain electrode of the thin film transistor, the passivation layer and the common electrode are stacked successively on the base substrate, and the source electrode of the thin film transistor are lapped on the pixel electrode.

10. The array substrate of claim 9, wherein the common electrode comprises a hollow area in correspondence with the active layer of the thin film transistor.

11. The array substrate of claim 9, wherein a projection of the active layer of the thin film transistor on the base substrate is of a rectangle, the source electrode of the thin film transistor is connected at an apex angle of the rectangle with the active layer and the drain electrode of the thin film transistor is connected with two edges of the active layer that are not adjacent to the apex angle of the rectangle.

12. The array substrate of claim 9, wherein a material for the active layer is amorphous silicon, low temperature poly-silicon or oxide semiconductor material, and an ohmic contact layer is disposed on a part of the active layer that is connected with the source electrode and the drain electrode.

13. The array substrate of claim 1, further comprising a base substrate, a gate insulating layer, a thin film transistor in each of the sub-pixels, an interlayer insulating layer, a resin insulating layer and a passivation layer; the thin film transistor comprising a gate electrode, an active layer, a source electrode and a drain electrode,
   wherein the gate electrode of the thin-film transistor, the gate insulating layer, the active layer of the thin-film transistor, the source electrode and the drain electrode of the thin-film transistor, the interlayer insulating layer, the resin insulating layer, the pixel electrode, the passivation layer and the common electrode are stacked successively on the base substrate, and
   wherein the array substrate further comprises a first via hole penetrating the resin insulating layer and the interlayer insulating layer and the pixel electrode is connected with the source electrode of the thin film transistor through the first via hole.

14. The array substrate of claim 13, wherein the common electrode covers entirely the array substrate.

15. The array substrate of claim 13, wherein a projection of the active layer of the thin film transistor on the base substrate is of a rectangle, the source electrode of the thin film transistor is connected at an apex angle of the rectangle with the active layer and the drain electrode of the thin film transistor is connected with two edges of the active layer that are not adjacent to the apex angle of the rectangle.

16. The array substrate of claim 13, wherein a material for the active layer is amorphous silicon, low temperature poly-silicon or oxide semiconductor material, and an ohmic contact layer is disposed on a part of the active layer that is connected with the source electrode and the drain electrode.

17. The array substrate of claim 1, further comprising a base substrate, a gate insulating layer, a thin film transistor in each of the sub-pixels, an interlayer insulating layer, a resin insulating layer and a passivation layer; the thin film transistor comprising a gate electrode, an active layer, a source electrode and a drain electrode, wherein the active layer of the thin-film transistor, the gate insulating layer, the gate electrode of the thin-film transistor, the interlayer insulating layer, the source electrode and the drain electrode of the thin-film transistor, the resin insulating layer, the pixel electrode, the passivation layer and the common electrode are stacked successively on the base substrate, wherein the base substrate further comprises a second via hole penetrating the gate insulating layer and the interlayer insulating layer through which the source electrode of the thin-film transistor is connected with the active layer; a third via hole penetrating the gate insulating layer and the interlayer insulating layer through which the drain electrode of the thin-film transistor is connected with the active layer of the thin-film transistor; and a fourth via hole penetrating the resin insulating layer through which the pixel electrode is connected with the source electrode of the thin-film transistor.

18. The array substrate of claim 17, wherein a projection of the active layer of the thin film transistor on the base substrate is of a rectangle, the source electrode of the thin film transistor is connected at an apex angle of the rectangle with the active layer and the drain electrode of the thin film transistor is connected with two edges of the active layer that are not adjacent to the apex angle of the rectangle.

19. The array substrate of claim 17, wherein a material for the active layer is amorphous silicon, low temperature poly-silicon or oxide semiconductor material, and an ohmic contact layer is disposed on a part of the active layer that is connected with the source electrode and the drain electrode.

20. A liquid crystal display device, comprising: the array substrate according to claim 1; a color filter substrate disposed oppositely to the array substrate; and a liquid crystal molecule layer between the array substrate and the color filter substrate.

* * * * *